US008922771B2

(12) United States Patent
Goodno et al.

(10) Patent No.: US 8,922,771 B2
(45) Date of Patent: Dec. 30, 2014

(54) MULTICHANNEL POLARIZATION STABILIZER

(75) Inventors: Gregory D. Goodno, Los Angeles, CA (US); Mark E. Weber, Hawthorne, CA (US); Stanley Benjamin Weiss, IV, Redondo Beach, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 528 days.

(21) Appl. No.: 13/419,054

(22) Filed: Mar. 13, 2012

(65) Prior Publication Data
US 2013/0105674 A1 May 2, 2013

Related U.S. Application Data

(60) Provisional application No. 61/553,600, filed on Oct. 31, 2011.

(51) Int. Cl.
*G01J 4/00* (2006.01)
*H01S 3/067* (2006.01)
*H01S 3/13* (2006.01)
*H01S 3/23* (2006.01)
*H01S 3/00* (2006.01)

(52) U.S. Cl.
CPC ........... *H01S 3/06754* (2013.01); *H01S 3/1307* (2013.01); *H01S 3/2383* (2013.01); *H01S 3/0085* (2013.01); *H01S 3/2308* (2013.01)
USPC ...................................................... 356/364

(58) Field of Classification Search
USPC ................................ 356/364; 250/559.09, 225
See application file for complete search history.

(56) References Cited

U.S. PATENT DOCUMENTS

| 3,986,123 | A | 10/1976 | Tirro |
| 5,117,440 | A | 5/1992 | Smith |
| 5,986,784 | A | 11/1999 | Kersey |
| 6,748,127 | B2 | 6/2004 | Nevis |
| 7,058,098 | B1 | 6/2006 | Shay |
| 7,095,963 | B2 * | 8/2006 | Knaack et al. ................ 398/205 |
| 7,187,492 | B1 | 3/2007 | Shay |
| 7,315,575 | B2 | 1/2008 | Sun |
| 7,346,085 | B1 | 3/2008 | Rothenberg |
| 7,411,726 | B2 | 8/2008 | Caplan |

(Continued)

OTHER PUBLICATIONS

Goodno, Gregory D. "Active phase and polarization locking of a 1.4 kW fiber amplifier" Optic Letters, vol. 35. No. 10, May 15, 2010 pp. 1542-1544.

(Continued)

*Primary Examiner* — Roy M Punnoose
(74) *Attorney, Agent, or Firm* — John A. Miller; Miller IP Group, PLC

(57) ABSTRACT

A multichannel polarization stabilizer including a mixing device responsive to a sample beam and a reference beam that provides an in-phase signal including the mixed sample beam and reference beam having a relative phase of 0° and a quadrature phase signal including the mixed sample beam and reference beam having a relative phase of 90°. The stabilizer also includes a photodetector responsive to the quadrature phase signal that converts the quadrature phase signal to a quadrature phase electrical signal. A polarization demultiplexer circuit receives the quadrature phase electrical signal and measures the amplitude of a frequency tone in the sample beam and provides a polarization amplitude signal. A polarization controller receives the polarization amplitude signal and controls the reference beam to maximize the polarization amplitude signal.

20 Claims, 3 Drawing Sheets

(56) References Cited

U.S. PATENT DOCUMENTS

| | | | |
|---|---|---|---|
| 7,636,525 | B1 | 12/2009 | Bontu |
| 7,683,828 | B2 | 3/2010 | Stagliano |
| 7,894,728 | B1 | 2/2011 | Sun |
| 7,899,340 | B1 | 3/2011 | Bontu |
| 7,936,999 | B1 | 5/2011 | Hawryluck |
| 8,005,368 | B2 | 8/2011 | Roberts |
| 2006/0263096 | A1 | 11/2006 | Dinu |
| 2009/0134310 | A1 | 5/2009 | Goodno |
| 2010/0215357 | A1 | 8/2010 | Westlund |
| 2011/0032603 | A1 | 2/2011 | Rothenberg |

OTHER PUBLICATIONS

Pouet, B., "Recent Progress in MultiChannel Quadrature interferometer: Demonstration of a Compact Fiberized Architecture" Review of Quantitative Nondestructive Evaluation vol. 26. 2007, pp. 1668-1675.

Inoue, Kyo, "Fiber Four-Wave Mixing Suprression Using Two Incoherent Polarized Lights" IEEE Journal of Lightwave Technology, vol. 11, No. 12. Dec. 1993. pp. 2116-2122.

Noe Reinhold, "Endless Polarization Control Systems for Coherent Optics" Journal of lightwave technology, vol. 6., No. 7, Jul. 7, 1988 pp. 1199-1208.

O'Meara T.R. "The multidither principle in adaptive optics" J. Optical Society of America, vol. 67, No. 3. Mar. 1977, pp. 306-315.

90-Degree Optical Hybrid, Optoplex 90° Optical Hybrid—QPSK Demodulator (www.optoplex.com/Optical_Hybrid.htm), Feb. 12, 2012.

(Optical Hybrid Enables Next-Generation Optical Communication) www.optoplex.com or infor@optoplex.com pp. 1-5, Feb. 22, 2012.

Goodno, Gregory D. "Multichannel polarization stabilization for coherently combined fiber laser arrays" Optice Letters, vol. 37, No. 20, pp. 4272-4274, Oct. 15, 2012.

Ma, Yanxing, "Coherent beam combination of 137 W fiber amplifier array using single frequency dithering technique" Optics and Lasers in Engineering, vol. 49, pp. 1089-1092, Apr. 2011.

* cited by examiner

MULTICHANNEL POLARIZATION STABILIZER

CROSS-REFERENCE TO RELATED APPLICATIONS

This application claims the benefit of the filing date of provisional application Ser. No. 61/553,600 titled, Multichannel Polarization Stabilizer, filed Oct. 31, 2011.

BACKGROUND

1. Field of the Disclosure

This invention relates generally to a multichannel laser amplifier array including polarization control for each beam channel to provide co-polarization in a coherently combined beam and, more particularly, to a multichannel laser amplifier array including a single polarization detector that detects the polarization for each beam channel after the beams are combined by analyzing a dither frequency in each beam to provide co-polarization in the coherently combined beam.

2. Discussion of the Related Art

High power laser amplifiers have many applications, including industrial, commercial, military, etc. Designers of laser amplifiers are continuously investigating ways to increase the power of the laser amplifier for these applications. One known type of laser amplifier is a multichannel high power fiber laser amplifier that employs doped fibers and pump beams to generate the laser beam. Typically, a high power fiber laser amplifier uses a fiber that has an active core diameter of about 10-20 µm or larger. Modern fiber laser amplifier designs have achieved single fiber power levels up to 10 kW.

A design challenge for multichannel fiber laser amplifiers is to combine the beams from each fiber in a coherent manner so that the beams provide a single output beam having a uniform phase over the beam diameter such that the beam can be focused to a small focal spot. Focusing the combined beam to a small spot at a long distance (far-field) defines the beam quality of the beam, where the more coherent the individual fiber beams the more uniform the combined phase and better the beam quality. Improvements in fiber laser amplifier designs increase the output power and coherency of the fiber beams in such a way as to approach the theoretical power and beam quality limit of the laser system.

The fiber beams in each channel of a multichannel fiber laser power amplifier array must also be co-polarized in the coherently combined beam to achieve high beam power and efficiency. Any depolarized light in the fiber beams will not combine coherently with the other beams and is effectively lost. The fibers comprising the fiber amplifier array induce depolarization in the fiber beams, which limits the combining efficiency of the fiber beams. It is known in the art to measure or detect the polarized power of each fiber beam in the amplifier array after the beam has been amplified and use the measured polarized power as an optimization (control) metric to provide feedback in a feedback loop to a polarization device to adjust the polarization of the beam to a desired polarization for all of the fiber beams. For a laser amplifier array including many fiber beams, for example, several hundred fiber beams, that are combined into a single combined beam, it is typically opto-mechanically complex to implement a large number of polarization sensors at the output of each fiber amplifier, where a separate sensor would be required for each fiber beam.

DETAILED DESCRIPTION OF THE EMBODIMENTS

The following discussion of the embodiments of the invention directed to a multichannel polarization stabilizer for detecting the polarization of individual beams in a combined beam from multiple fiber channels in a fiber laser amplifier array is merely exemplarily in nature, and is in no way intended to limit the invention or its applications or uses.

Figure 1:
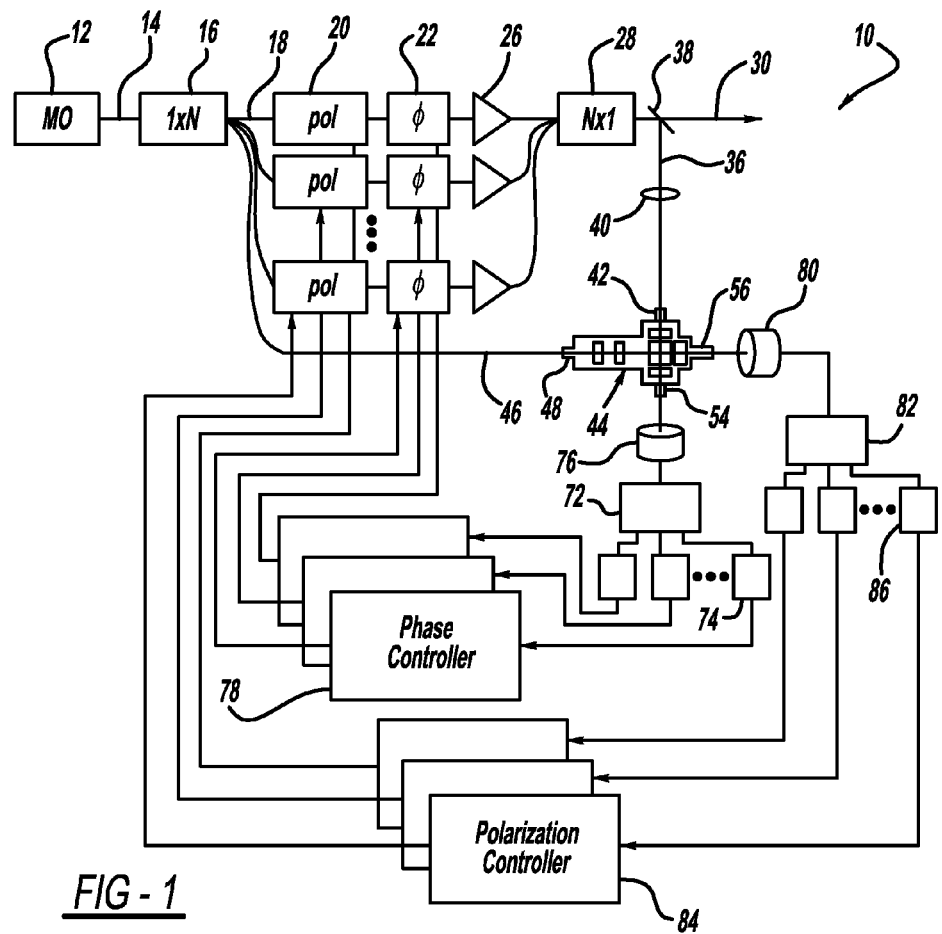
FIG. 1 is a schematic diagram of a fiber laser amplifier array including a plurality of fiber channels and a single polarization stabilizer.

FIG. 1 is a schematic block diagram of a fiber laser amplifier system 10 including a master oscillator (MO) 12 that generates a signal beam on an optical fiber 14. The signal beam is split into a certain number of split beams, for example, several hundred beams, by a beam splitter 16 to provide fiber beams on a plurality of fiber channels 18. Although this embodiment shows each channel being a fiber channel, in an alternate embodiment, the channel beams can travel through space instead of through fiber. The fiber beams on each fiber channel 18 are then sent through a polarization actuator 20 that provides polarization control for the beam, discussed in more detail below. The polarization actuator 20 can be any polarization actuator suitable for the purposes discussed herein many of which are known in the art. Each polarized fiber beam is then sent to a phase modulator 22 that corrects the phase of each fiber beam so that the fiber beam in each channel 18 is in phase with the other fiber beams to be combined as a single coherent beam. For reasons that will become apparent from the discussion below, each of the phase modulators 22 also modulates a unique dither frequency, for example, around 100 MHz, onto the fiber beam that is used to identify the particular fiber beam after it is combined with the other fiber beams. The polarized and phase controlled fiber beam is then amplified in each fiber channel 18 by a fiber amplifier 26, which can be any suitable amplifier for the purposes discussed herein. For example, the fiber amplifiers 26 can be doped amplifying portions of the fiber that receive an optical pump beam (not shown). Each amplified fiber beam is then combined by a suitable beam combiner 28 to generate a combined high power output beam 30.

As mentioned above, the various optical components in the fiber channels 18, especially the fiber amplifiers 26, induce depolarization on the fiber beams so that each fiber beam may have a different elliptical polarization when combined by the beam combiner 28. Those parts of the fiber beams that are not at the same polarization as the other fiber beams do not constructively interfere in the beam combiner 28 and the power fraction of the portion of light that is not properly polarized is lost in the combined output beam 30. In other words, only the co-polarized portions of the fiber beams will add in phase to generate the output power of the combined output beam 30.

The present invention proposes a polarization stabilizer for detecting the polarized power of each fiber beam after it is combined in the combined output beam 30 by using the unique dither frequency in each fiber beam. The detected polarized power can then be used to control the polarization actuators 20 of all of the fiber beams so that all of the fiber beams are co-polarized and combine to add power in the combined output beam 30. As mentioned above, known polarization controllers of multiple fiber beams require that each fiber beam include its own polarization detector to control its polarization to coherently match the polarization of each fiber beam with the polarization of the other beams.

Figure 2:
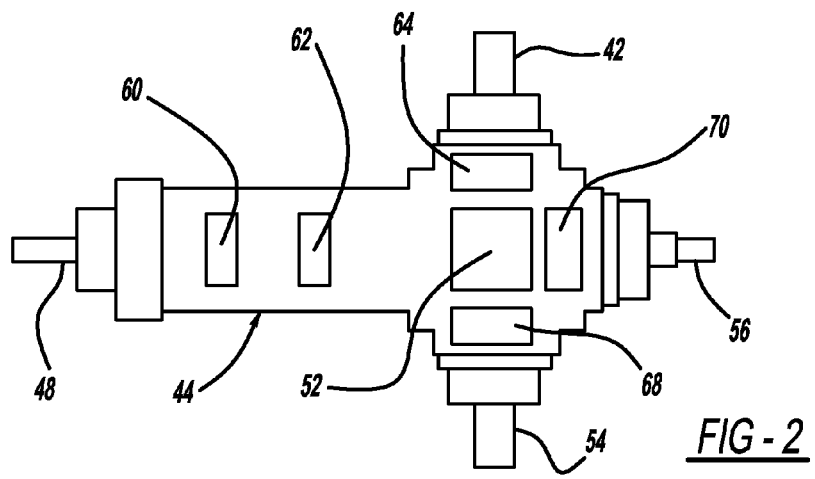
FIG. 2 is a schematic diagram of a quadrature mixing device operating as a polarized power detector in the amplifier array shown in FIG. 1.

In order to detect the phase and polarization of each of the fiber beams in the combined beam, a low power sample beam 36 is split off from the combined output beam 30 by a beam splitter 38 and is directed by suitable optics 40 to a sample beam input 42 of a quadrature mixing device 44, where the sample beam 36 includes phase and polarization information for each of the fiber beams. FIG. 2 is a schematic type diagram of the mixing device 44 separated from the system 10, where the mixing device 44 operates as a 90° optical hybrid whose operation, generally discussed below, is well understood by those skilled in the art. Additionally, a reference beam from the beam splitter 16 on a reference fiber 46 is provided to a reference beam input 48 of the mixing device 44. By using a series of wave plates, discussed in detail below, the sample beam 36 and the reference beam are interfered with each other in a polarizing beam splitter 52 to generate an in-phase signal beam at an in-phase output 54 and a quadrature phase signal beam at a quadrature phase output 56. Particularly, the reference beam is sent through a half-wave plate (HWP) 60 and a quarter-wave (QWP) plate 62 and the sample beam 32 is sent through an HWP 64. As will be appreciated by those skilled in the art, the specific configuration of the mixing device 44 shown and discussed herein is by way of a non-limiting example in that other devices may be applicable, such as a frequency shifting device, to generate an in-phase signal and a quadrature-phase signal from the sample beam 36 and the reference beam.

The HWP 60 creates bi-refringence in the reference beam so that one linear polarization component in the reference beam is delayed relative to the other linear polarization component in the beam by 180°, or half of a wave. The QWP 62 then causes one of the linear polarization components in the reference beam that is now 180° out of phase with the other linear polarization component to be delayed one-quarter of a wave (90°) to create circular polarization for that polarization component. Likewise, the HWP 64 creates bi-refringence in the sample beam 36 so that one of the linear polarization components in the beam 36 is delayed relative to the other linear polarization component in the beam 36 by 180°. The reference beam that has now been separated into a linearly polarization component and a circular polarization component and the sample beam 36 that has been separated into two linear polarization components are mixed in the polarizing beam splitter 52, where one of the linear polarization components in the sample beam 36 and the circular polarization component in the reference beam are directed to the quadrature output 56 and the other linear polarization components in the sample beam 36 and the reference beam are directed to the in-phase output 54.

Because the orthogonally polarized components in the sample beam 36 and the reference beam do not interfere in the polarization beam splitter 52, the two outputs of the polarizing beam splitter 52 have orthogonal polarizations. Therefore, the in-phase signal beam from the polarizing beam splitter 52 is sent through a 45° polarizer 68 and the quadrature signal beam from the polarizing beam splitter 52 is sent through a 45° polarizer 70 to make the polarization of the two beams the same. Thus, the mixing device 44 optically mixes the sample beam 32 and the reference beam to include a super-position of polarization-filtered, phase-locked fiber beams from the beam combiner 28.

The in-phase signal beam from the output 54 is sent to a photodetector 76 that converts the optical signal to an electrical signal. The electrical output of the photodetector 76 will exhibit beats (tones) in frequency depending on the dither frequency that was applied to the particular fiber beam by the phase modulator 22, where the beats are at the dither frequency. Therefore, the electrical signal from the photodetector 76 includes a superposition of the beats at defined unique dither frequencies provided by the phase modulators 22.

The signal from the photodetector 76 is provided to a signal splitter 72 that splits the signal into a plurality of separate signals that are provided to a plurality of phase demultiplexer circuits 74. The number of the circuits 74 is the same as the number of the channels 18, where each circuit 74 includes information related to the dither frequency for the particular channel, and where each circuit 74 measures the amplitude of the frequency for that channel 18. The output of each circuit 74 is provided to a separate phase controller 74 that controls a particular phase modulator 22. Each phase controller 78 identifies the relative phase of the beats to each other in the in-phase signal that identifies the phase difference between the fiber beam in a particular channel and the reference beam. The phase controller 78 provides a control signal to each of the phase modulators 22 based on the phase of its beat frequency relative to the other beat frequencies to cause each of the fiber beams to be in phase with each other. This phase control process causes the phases of the sample beam 36 and the reference beam to be phase-locked, where the phase locking will be provided at both the in-phase output 54 with a zero relative phase and the quadrature phase output 56 with a 90° relative phase. This process of providing phase control in a plurality of beam channels based on a combined beam including frequency dithering is well documented in the art, for example, see U.S. Pat. No. 7,058,098 issued to Shay on Jun. 6, 2006.

Each phase controller 78 attempts to null out each of the beat signals in the in-phase signal so that when the beat signals are nulled, all of the fiber beams are in phase with each other, and the output power in the combined beam 30 provided by the phase control is maximized. Because those beat frequencies are nulled, the beat signals in the in-phase signal from the photodetector 76 cannot be used to provide polarization control. However, the signal at the quadrature output 56, which is locked 90° out of phase with the reference beam, will have strong beat signals due to interference with the 90° phase-shifted reference beam even though the fiber beams are in phase with each other. Thus, the magnitude of the beat frequencies in the quadrature signal can be used to determine the polarized power fraction that a particular fiber beam is contributing to the polarization power. In other words, the magnitude of the beat signal at each dither frequency for a particular fiber channel 18 is proportional to the polarization power fraction for the fiber beam in that channel 18.

As above, the optical signal from the mixing device 44 at the quadrature output 56 is converted to an electrical signal by a photodetector 80. The amount of power in each dither frequency is then measured to command the actuator 20 in each fiber channel 18 to adjust the polarization to increase the power. The electrical signal from the photodetector 80 includes information of the polarization of each of the optical signals in each channel 18 based on the dither frequency that is applied to that channel 18. The electrical signal from the photodetector 80 is split by a signal splitter 82 and sent to a plurality of quadrature polarization demultiplexer circuits 86, one for each channel 18, that separate the amplitude of the electrical signal for the particular frequency for the particular channel 18. Particularly, each circuit 86 extracts amplitude information for the particular reference tone or dither frequency for the channel 18 it is associated with. That amplitude signal is then applied to a separate one of a plurality of polarization controllers 84, one for each channel 18, that utilizes the electrical signal as an optimization metric to provide feedback control to the particular polarization actuator 20 associated with that controller 84 so that the amplitude is set to a maximum. The polarization controller 84 varies the input to the polarization actuator 20 and watches how that affects the amplitude of the signal from the circuit 86 so that it can identify the maximum amplitude for that signal.

Figure 3:
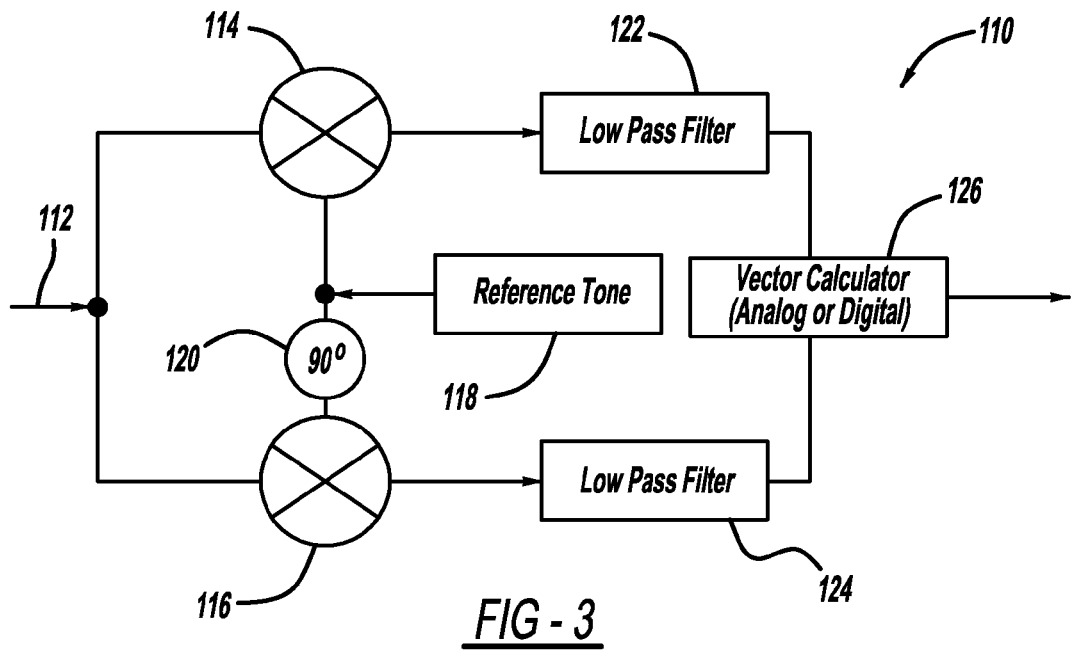
FIG. 3 is a schematic block diagram of a polarization demultiplexer circuit that can be used in the fiber laser amplifier array shown in FIG. 1.
Figure 4:
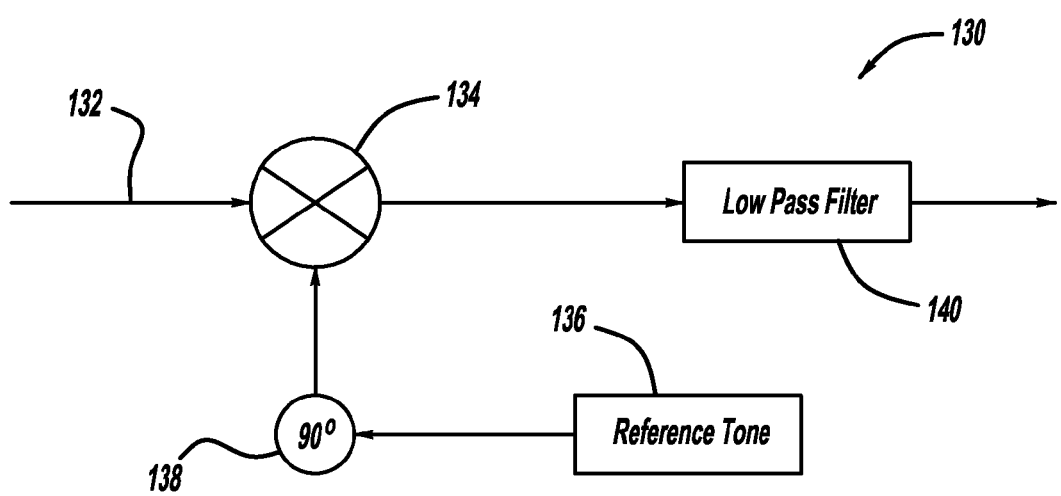
FIG. 4 is a schematic block diagram of another polarization demultiplexer circuit that can be used in the fiber laser amplifier array shown in FIG. 1.
Figure 5:
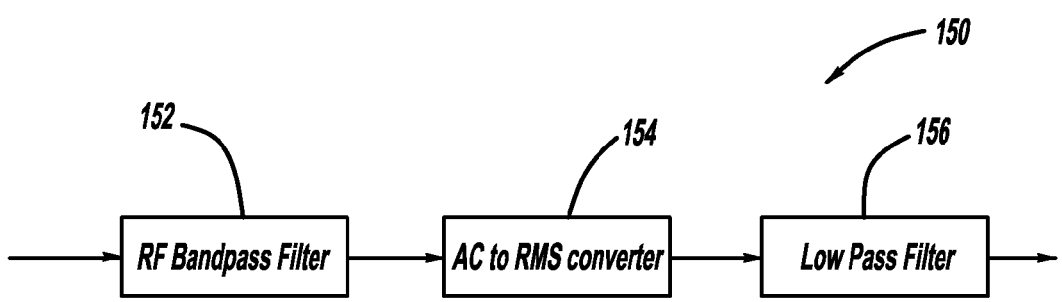
FIG. 5 is a schematic block diagram of another polarization demultiplexer circuit that can be used in the fiber laser amplifier array shown in FIG. 1.

The quadrature demultiplexer circuits 86 can be any circuit suitable for the purposes discussed herein, many of which are well known by those skilled in the art. Three examples are shown in FIGS. 3-5, and described in brief detail below. Particularly, FIG. 3 is a schematic block diagram of a quadrature demultiplexer circuit 110 that can be used as the circuits 86. The signal from the splitter 82 is provided on line 112 to a pair of mixers 114 and 116. The reference tone provided at box 118 for the particular channel 18 associated with the circuit 86 is also provided to the mixers 114 and 116, where the reference tone is phase shifted 90° by a phase shifter 120 before it is applied to the mixer 116. The mixers 114 and 116 provide the sum and differences of the frequencies of the signal from the splitter 82 that includes all of the reference tones and the reference tone at the two phases. These sum and difference signals from the mixers 114 and 116 are low-pass filtered by low pass filters 122 and 124, respectively, to remove all of the frequencies of the tones for the other channels and noise. A vector calculator 126 squares the two signals from the filters 122 and 124 and adds them together. Therefore, no matter what the phase difference is between the reference tone and the inputs of the mixtures 114 and 116, the amplitude of the output of the vector calculator 126 will be the same. The circuit 110 has the advantage of not requiring phase control between the mixers 114 and 116 and the RF local oscillator that imposes the frequency dither on the channel 18 and provides the reference tone.

FIG. 4 is a schematic block diagram of a quadrature demultiplexer circuit 130 that can also be used as the circuits 86. The circuit 130 employs a single mixer 134 that receives the signal from the splitter 82 on line 132. The reference tone for the particular channel 18 is provided at box 136 to a 90° phase shifter 138 and the phase shifted reference tone is mixed with the signal from the splitter 82 by the mixer 134 to provide the sum and difference frequencies. In this design, the phase control between the signal from the splitter 82 and the reference tone needs to be optimized. The sum and difference signal from the mixer 134 is then low pass filtered by a low pass filter 140 to remove all of the other reference tone frequencies for the other channels 18. The circuit 130 has the advantage of requiring only a single mixer and for avoiding vector calculator electronics needed to square and sum the mixer outputs.

FIG. 5 is a schematic block diagram of a quadrature demultiplexer circuit 150 that can also be used as the circuits 86. The signal from the splitter 82 is provided to an RF band pass filter 152 that is a tightly controlled filter that only passes the frequency of the reference tone for the particular channel 18. The reference tone frequency is converted to a DC signal in an AC to root mean square (RMS) converter 154 and the converted band pass filtered signal is low pass filtered by a low pass filter 156 to remove noise.

Figure 6:
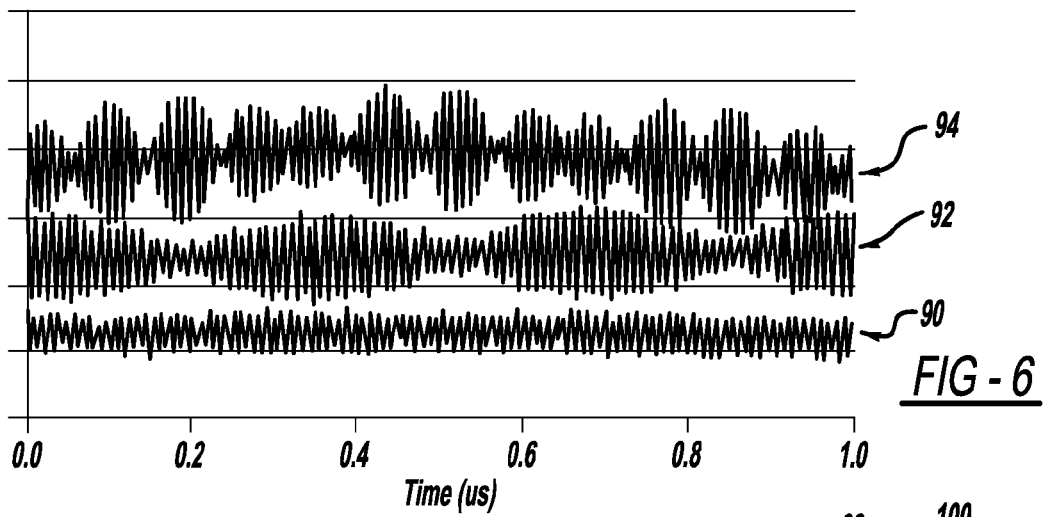
FIG. 6 is a graph with time on the horizontal axis showing quadrature photodetector signals as channels are added together.

FIG. 6 is a graph with time on the horizontal axis showing that beat frequencies in the quadrature signal from the photodetector 80 for three different combined signals can be readily indentified. Graph line 90 shows a quadrature photodetector signal of an interfered reference beam and sample beam, where the sample beam includes only a single fiber channel that has been dithered with a 100 MHz modulation signal. Graph line 92 shows a quadrature photodetector signal of an interfered reference beam and sample beam, where the sample beam has two fiber channels, and where one channel has been dithered with a 100 MHz modulation signal and the other channel has been dithered with a 103 MHz modulation signal. Graph line 94 shows a quadrature photodetector signal for an interfered reference beam and sample beam, where the sample beam has three fiber channels, and where one of the channels is modulated at 100 MHz, one of the channels is modulated at 103 MHz and a third channel is modulated at 112 MHz. FIG. 6 shows that as more fiber channels are added to the amplifier each having a unique dither frequency, those dither frequencies can be clearly identified in the combined beam at the quadrature output of the mixing device 44 as detected by the photodetector 80. Thus, the demultiplexer circuits 86 can easily filter and identify the particular frequency of each channel 18, and the polarization controllers 84 can maximize the amplitude of each particular demultiplexed signal by controlling the polarization of the particular fiber channel 18 using its polarization actuator 20.

Figure 7:
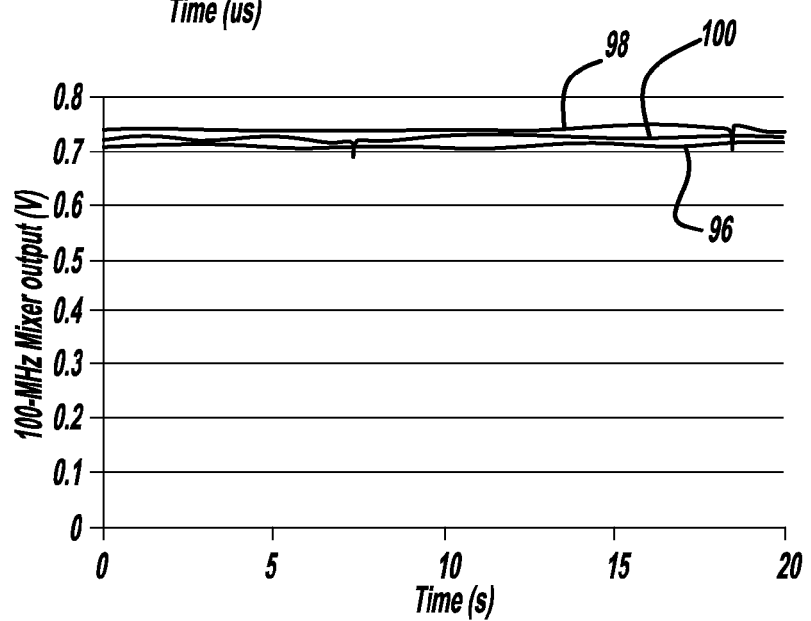
FIG. 7 is a graph with time on the horizontal axis and output in volts on the vertical axis showing polarized power extracted from the quadrature photodetector signals.

FIG. 7 is a graph with time on the horizontal axis and beat signal amplitude in volts on the vertical axis for a 100 MHz mixer showing signals extracted from the quadrature photodetector signals for all three of the examples discussed above for FIG. 6. Graph line 96 is for the quadrature photodetector signal where the sample beam includes one channel dithered at 100 MHz, graph line 98 is for the quadrature photodetector signal where the sample beam includes two channels, where one channel is dithered at 100 MHz and the other channel is frequency dithered at 103 MHz, and graph line 100 is for the quadrature photodetector signal where the sample beam includes three channels, where one channel is dithered at 100 MHz, one channel is dithered at 103 MHz and the third channel is dithered at 112 MHz. FIG. 7 shows that an RF-filtered quadrature photodetector signal at 100 MHz is proportional to the 100 MHz channels polarized power and does not change as more fiber channels are added.

Figure 8:
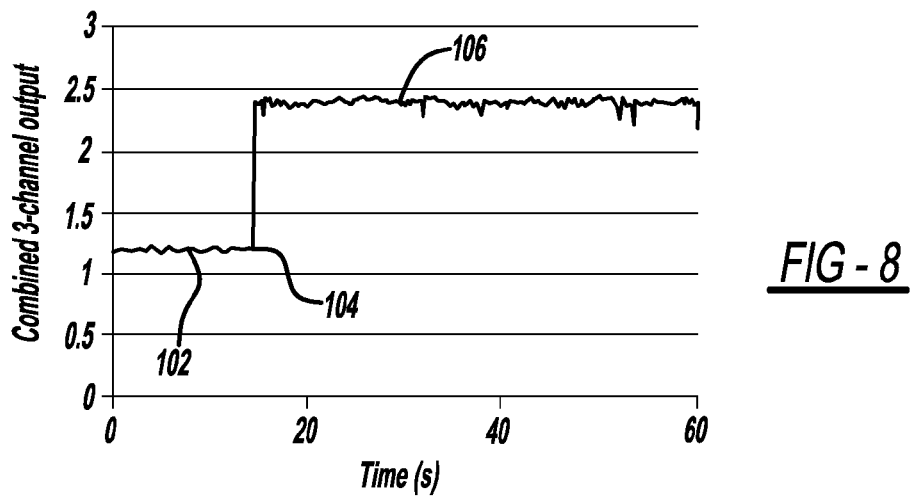
FIG. 8 is a graph with time on the horizontal axis and channel output on the vertical axis showing a closed-loop performance of a multi-channel fiber laser amplifier.

FIG. 8 is a graph with time on the horizontal axis and the detected power of the coherently combined high power output beam 30 in volts on the vertical axis showing operation of the controller 84 for the example discussed above. For the time period represented by line 102, the three channels dithered at 100 MHz, 103 MHz and 112 MHz are intentionally de-polarized and the output power in the combined beam 30 is low. The polarization controller 84 is switched on at time 104 where the power of the coherently combined output beam 30 jumps to line 106 within 200 ms.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments. One skilled in the art will readily recognize from such discussion, and from the accompanying drawings and claims, that various changes, modifications and variations can be made therein without departing from the spirit and scope of the invention as defined in the following claims.

What is claimed is:

1. A fiber amplifier system comprising:
a master oscillator generating a signal beam;
a master beam splitter for splitting the signal beam into a plurality of fiber beams;
a plurality of polarization actuators each receiving one of the fiber beams, said polarization actuators providing polarization control of the fiber beams;
a plurality of phase modulators each receiving one of the fiber beams, said phase modulators modulating the fiber beam with a unique dither frequency and providing phase control of the fiber beams;
a plurality of fiber amplifiers each receiving a fiber beam from one of the phase modulators, said fiber amplifiers amplifying the fiber beams;
a beam combiner combining the amplified fiber beams into a combined beam;
a sample beam splitter for separating a low power sample beam from the combined beam;
a reference beam provided by the master beam splitter;
a mixing device responsive to the sample beam and the reference beam, said mixing device providing an in-phase optical signal including a superposition of the sample and reference beams with a relative phase difference of 0° and a quadrature phase optical signal including a superposition of the sample and reference beams with a relative phase difference of 90°;
a first photodetector responsive to the in-phase optical signal and converting the in-phase optical signal to an in-phase electrical signal;
a second photodetector responsive to the quadrature phase optical signal and converting the quadrature phase optical signal to a quadrature phase electrical signal;
a plurality of phase demultiplexer circuits including a single phase demultiplexer circuit for each fiber beam and being responsive to the in-phase electrical signal, each phase demultiplexer circuit measuring the phase of the dither frequency for its fiber beam and providing a phase signal;
a plurality of phase controllers including a single phase controller for each fiber beam, each phase controller being responsive to one to the phase signals and controlling the phase modulator for that fiber beam to null the phase signal;
a plurality of polarization demultiplexer circuits including a single polarization demultiplexer circuit for each fiber beam and being responsive to the quadrature phase electrical signal, each polarization demultiplexer circuit measuring the amplitude of the dither frequency for its fiber beam and providing a polarization amplitude signal; and
a plurality of polarization controllers including a single polarization controller for each fiber beam, each polarization controller being responsive to one to the polarization amplitude signals and controlling the polarization actuator for that fiber beam to maximize the polarization amplitude signal.

2. The system according to claim 1 wherein the mixing device includes a plurality of wave plates for modifying the polarization of the sample beam and the reference beam, said mixing device further including a polarizing beam splitter that mixes the polarization modified reference beam and sample beam.

3. The system according to claim 2 wherein the mixing device includes a first half-wave plate that receives the reference beam and modifies the polarization of the reference beam to provide two linear polarization components, a second half-wave plate that is responsive to the sample beam and modifies the polarization of the sample beam to provide two linear orthogonal polarization components and a quarter-wave plate that receives the reference beam from the first half-wave plate and provides a 90° phase shift to one of the linear polarized components in the reference beam, said polarizing beam splitter receiving the reference beam from the quarter-wave plate and the sample beam from the second half-wave plate and mixing the sample beam and reference beam to provide orthogonally oriented polarization components of the sample beam and reference beam for the in-phase signal and to provide orthogonally oriented polarization components of the sample beam and reference beam for the quadrature phase signal.

4. The system according to claim 3 wherein the mixing device further includes a first 45° polarizer that receives the in-phase signal from the polarizing beam splitter to provide commonly polarized sample and reference beam outputs and a second 45° polarizer that receives the quadrature phase signal from the polarizing beam splitter to provide commonly polarized sample and reference beam outputs.

5. The system according to claim 1 wherein each polarization demultiplexer circuit includes a single frequency mixer that mixes the quadrature phase signal and the dither frequency for the fiber beam.

6. The system according to claim 1 wherein each polarization demultiplexer circuit includes two mixers that each mixes the quadrature phase signal and the dither frequency for the fiber beam.

7. The system according to claim 1 wherein each polarization demultiplexer circuit includes an RF filter centered at the dither frequency for the fiber beam that extracts RF power at that dither frequency from the quadrature phase signal.

8. The system according to claim 1 wherein the master beam splitter splits the signal beam into several hundred fiber beams.

9. A multichannel polarization stabilizer comprising:
a mixing device responsive to a sample beam and a reference beam, said mixing device providing an in-phase optical signal including a superposition of the sample and reference beams with a relative phase difference of 0° and a quadrature phase optical signal including a superposition of the sample and reference beams with a relative phase difference of 90°;

a photodetector responsive to the quadrature phase optical signal and converting the quadrature phase optical signal to a quadrature phase electrical signal;
a polarization demultiplexer circuit responsive to the quadrature phase electrical signal, said polarization demultiplexer circuit measuring the amplitude of a frequency tone in the sample beam and providing a polarization amplitude signal; and
a polarization controller responsive the polarization amplitude signal and controlling the reference beam to maximize the polarization amplitude signal.

10. The system according to claim 9 wherein the mixing device includes a plurality of wave plates for modifying the polarization of the sample beam and the reference beam, said mixing device further including a polarizing beam splitter that mixes the polarization modified reference beam and sample beam.

11. The system according to claim 10 wherein the mixing device includes a first half-wave plate that receives the reference beam and modifies the polarization of the reference beam to provide two linear polarization components, a second half-wave plate that is responsive to the sample beam and modifies the polarization of the sample beam to provide two linear orthogonal polarization components and a quarter-wave plate that receives the reference beam from the first half-wave plate and provides a 90° phase shift to one of the linear polarized components in the reference beam, said polarizing beam splitter receiving the reference beam from the quarter-wave plate and the sample beam from the second half-wave plate and mixing the sample beam and reference beam to provide orthogonally oriented polarization components of the sample beam and reference beam for the in-phase signal and to provide orthogonally oriented polarization components of the sample beam and reference beam for the quadrature phase signal.

12. The system according to claim 11 wherein the mixing device further a first 45° polarizer that receives the in-phase signal from the polarizing beam splitter to provide commonly polarized sample and reference beam outputs and a second 45° polarizer that receives the quadrature phase signal from the polarizing beam splitter to provide commonly polarized sample and reference beam outputs.

13. The system according to claim 9 wherein the polarization demultiplexer circuit includes a single frequency mixer that mixes the quadrature phase signal and the frequency tone.

14. The system according to claim 9 wherein the polarization demultiplexer circuit includes two mixers that each mixes the quadrature phase signal and the frequency tone.

15. The system according to claim 9 wherein each polarization demultiplexer circuit includes an RF filter centered at the dither frequency for the fiber beam that extracts RF power at that dither frequency from the quadrature phase signal.

16. A fiber amplifier system comprising:
a master oscillator generating a signal beam;
a master beam splitter for splitting the signal beam into a plurality of fiber beams;
a plurality of polarization actuators each receiving one of the fiber beams, said polarization actuators providing polarization control of the fiber beams;
a plurality of fiber amplifiers for amplifying the fiber beams;
a beam combiner combining the amplified fiber beams into a combined beam;
a sample beam splitter for separating a low power sample beam from the combined beam;
a reference beam provided by the master beam splitter;
a mixing device responsive to the sample beam and the reference beam, said mixing device providing an in-phase optical signal including a superposition of the sample and reference beams with a relative phase difference of 0° and a quadrature phase optical signal including a superposition of the sample and reference beams with a relative phase difference of 90°;
a photodetector responsive to the quadrature phase optical signal and converting the quadrature phase optical signal to a quadrature phase electrical signal;
a plurality of polarization demultiplexer circuits including a single polarization demultiplexer circuit for each fiber beam and being responsive to the quadrature phase electrical signal, each polarization demultiplexer circuit measuring the amplitude of the dither frequency for its fiber beam and providing a polarization amplitude signal; and
a plurality of polarization controllers including a single polarization controller for each fiber beam, each polarization controller being responsive to one to the polarization amplitude signals and controlling the polarization actuator for that fiber beam to maximize the polarization amplitude signal.

17. The system according to claim 16 wherein the mixing device includes a plurality of wave plates for modifying the polarization of the sample beam and the reference beam, said mixing device further including a polarizing beam splitter that mixes the polarization modified reference beam and sample beam.

18. The system according to claim 17 wherein the mixing device includes a first half-wave plate that receives the reference beam and modifies the polarization of the reference beam to provide two linear polarization components, a second half-wave plate that is responsive to the sample beam and modifies the polarization of the sample beam to provide two linear orthogonal polarization components and a quarter-wave plate that receives the reference beam from the first half-wave plate and provides a 90° phase shift to one of the linear polarized components in the reference beam, said polarizing beam splitter receiving the reference beam from the quarter-wave plate and the sample beam from the second half-wave plate and mixing the sample beam and reference beam to provide orthogonally oriented polarization components of the sample beam and reference beam for the in-phase signal and to provide orthogonally oriented polarization components of the sample beam and reference beam for the quadrature phase signal.

19. The system according to claim 18 wherein the mixing device further includes a first 45° polarizer that receives the in-phase signal from the polarizing beam splitter to provide commonly polarized sample and reference beam outputs and a second 45° polarizer that receives the quadrature phase signal from the polarizing beam splitter to provide commonly polarized sample and reference beam outputs.

20. The system according to claim 16 wherein each polarization demultiplexer circuit includes a single frequency mixer that mixes the quadrature phase signal and the dither frequency for the fiber beam.

* * * * *